UNITED STATES PATENT OFFICE.

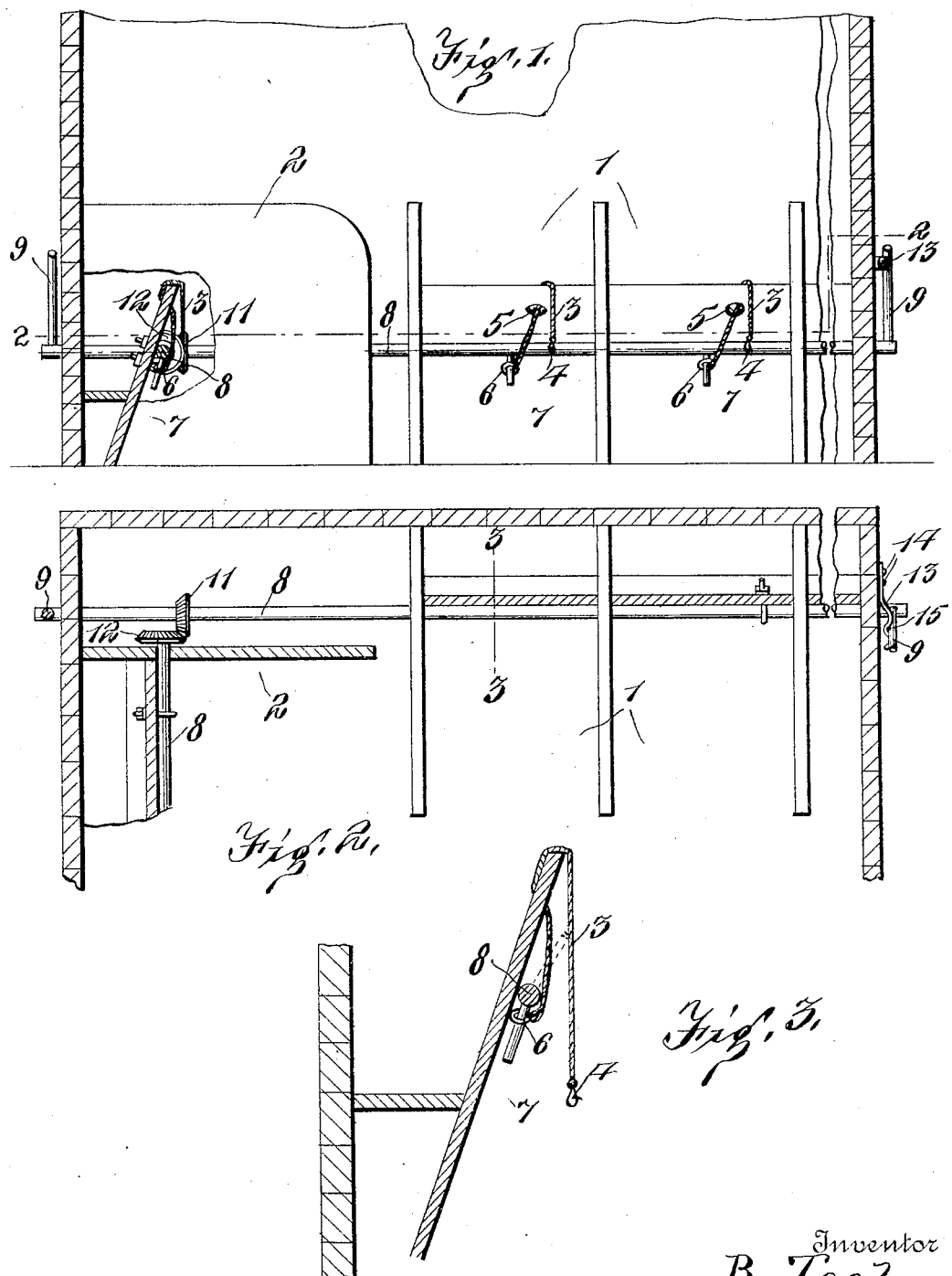

BENJAMIN TEAL, OF WALLA WALLA, WASHINGTON.

STOCK-RELEASING DEVICE.

No. 803,726.  Specification of Letters Patent.  Patented Nov. 7, 1905.

Application filed June 5, 1905. Serial No. 263,806.

*To all whom it may concern:*

Be it known that I, BENJAMIN TEAL, a citizen of the United States, residing at Walla Walla, in the county of Wallawalla and State of Washington, have invented certain new and useful Improvements in Stock-Releasing Devices; and I do declare the following to be a full, clear, and exact description of the invention, such as will enable others skilled in the art to which it appertains to make and use the same.

My invention relates to improvements in devices for automatically untying or releasing horses, cattle, and other stock from their stalls in stables, barns, and the like.

The object of the invention is to provide a simple, comparatively inexpensive, and highly efficient device of this character by means of which all the stock in a stable or other building may be quickly and simultaneously released in case of fire or other calamity to permit them to escape from the building.

With the above and other objects in view the invention consists of certain novel features of construction, combination, and arrangement of parts, as will be hereinafter more fully described, and particularly pointed out in the appended claims.

In the accompanying drawings, Figure 1 is a vertical longitudinal sectional view through a portion of a stable or the like, showing a series of stalls equipped with my improved stock-releasing device. Fig. 2 is a horizontal sectional view taken on the line 2 2 of Fig. 1, and Fig. 3 is a detail vertical transverse sectional view taken on the line 3 3 of Fig. 2.

Referring to the drawings by numerals, 1 and 2 denote two series of parallel stalls arranged along the side and end of a stable, barn, or other building. The horses, cattle, or other stock are tied in the stalls by flexible connections 3, which may be in the form of ropes or chains and which have at one end snap-hooks or other attaching devices 4. The opposite ends of these connections 3 are passed through guide-openings 5, formed in the manger, feed-trough, or other portion of the frame of the stall, and have at their extreme ends loops or eyes 6, which are adapted to engage locking pins or projections 7, provided upon oscillatory shafts or rods 8, mounted in suitable bearings and extending transversely through the stalls 1 and 2. One of these pins or projections 7 is provided in each of the stalls for the purpose of securing the looped or inner end of the connections 3 attached to the stock. When the projections 7 are in their lowered position, (shown in full lines in Fig. 3,) it will be seen that the loops on the connections 4 will be prevented from becoming disengaged from said projections and that when the latter are swung upwardly to their dotted-line position (shown in Fig. 3) said loops will readily slip off of the projections to release the stock from the stalls. The shafts 8 may be rocked or oscillated by one or more operating-levers 9, secured upon their outer ends, which project through the walls of the building, and the same are preferably operated simultaneously by providing upon their adjacent ends beveled gears 11 12, which mesh with each other, as shown in Fig. 2.

In order to lock the projections 7 in their lowered position, I preferably provide upon the outside of the building a spring-keeper 13 to coact with one of the levers 9. This keeper is in the form of a flat spring having one of its ends secured as shown at 14 and its opposite end bent to provide a seat or socket 15, adapted to receive the lever 9 when the projections 7 are in their lowered position.

The construction, operation, and advantages of the invention will be readily understood from the foregoing description, taken in connection with the accompanying drawings. It will be seen that in case of fire all of the horses, cattle, or other stock in a building may be quickly untied or released by simply operating one of the levers 9, so that the projections 7 upon the shafts 8 will be swung upwardly to permit the ropes, chains, or connections 3, by which the stock are secured, to be released.

While I have shown and described the stalls as being arranged along one end and one side of a stable or other building, it will be understood that they may be arranged along all of the four walls of the building or in parallel rows and that all of the releasing devices may be simultaneously operated by gearing the shafts together.

Various changes in the form, proportion, and the minor details of construction may be resorted to without departing from the principle or sacrificing any of the advantages of this invention.

Having thus described my invention, what

I claim as new, and desire to secure by Letters Patent, is—

1. The combination with a series of stalls, of an oscillatory rod or shaft extending transversely therethrough, an arm or projection upon said rod in each of said stalls, an operating-lever upon one end of said rod, a locking-spring to coact with said lever, and flexible stock fastening or tying connections passed through guide-openings upon the frames of said stalls and provided with loops to engage the arms upon said shaft.

2. The combination with a plurality of series of parallel stalls, of oscillatory shafts or rods extending through said series and transversely with respect to said stalls, projections upon said shafts in said stalls, an operating-lever upon one of said shafts, gearing between said shafts to cause them to move together, a flat locking-spring having a seat to receive said lever, and flexible stock fastening or tying connections passed through guide-openings in the frames of said stalls and provided with loops or eyes to engage the projections upon said shafts, substantially as described.

In testimony whereof I have hereunto set my hand in presence of two subscribing witnesses.

BEN. TEAL.

Witnesses:
MARVIN EVANS,
VLASTA HONDEK.